United States Patent [19]

Campbell

[11] 4,159,576
[45] Jul. 3, 1979

[54] RADIATION SHADOW INDICATOR

[76] Inventor: Richard A. Campbell, 1302 Toney Dr., Huntsville, Ala. 35802

[21] Appl. No.: 956,167

[22] Filed: Oct. 31, 1978

Related U.S. Application Data

[63] Continuation of Ser. No. 778,311, Mar. 16, 1977, abandoned.

[51] Int. Cl.² .......................... G01C 1/00; G02B 21/24; G02B 23/16
[52] U.S. Cl. ...................................... 33/281; 33/1 H; 350/83
[58] Field of Search ................ 33/281, 282, 283, 1 H, 33/1 SC, 227, 228; 350/83; 248/485, 486, 487; 353/3; 126/270, 271

[56] References Cited

U.S. PATENT DOCUMENTS

| | | | |
|---|---|---|---|
| 2,212,346 | 8/1940 | Kroon | 350/83 |
| 3,580,363 | 5/1971 | Plawner | 350/83 |
| 3,942,865 | 3/1976 | Rand | 350/83 |

*Primary Examiner*—Steven L. Stephan
*Attorney, Agent, or Firm*—Joseph H. Beumer; John R. Manning; L. D. Wofford, Jr.

[57] ABSTRACT

A radiation shadow indicator having a sight tube for sighting shadow-casting objects along a sighting axis. The indicator includes a system of gimbals mounting the tube for angular movement so that the sighting axis thereof may be caused to follow the apparent diurnal movement of celestial objects at various seasons of the year. Position indicators are provided for instantaneous read-out of angular positions of the gimbal device which, in turn, correspond to positions of the sighting axis at given seasons and/or times of day in relation to the location of the indicator on the surface of the earth.

7 Claims, 4 Drawing Figures

RADIATION SHADOW INDICATOR

ORIGIN OF THE INVENTION

The invention described herein was made by an employee of the United States Government and may be manufactured and used by or for the Government for governmental purposes without the payment of any royalties thereon or therefor.

This is a continuation of application Ser. No. 778,311, filed Mar. 16, 1977.

BACKGROUND OF THE INVENTION

1. Field of the Invention

The present invention relates to a radiation shadow indicator, and more particularly to an indicator which is positioned at a point on the earth for acquiring an indication of objects which cast shadows on the point at any selected time of year and day.

2. Description of the Prior Art

When installing a solar energy system it is essential to select a site for a solar energy collector which will receive as much solar radiation as possible, especially at the hours and/or seasons where the solar energy is most required. In order to determine the amount of solar energy that will be available at a potential site it is, of course, necessary to consider shadows cast on the site by terrestrial objects during annual as well as diurnal periods.

The existing method for accurately determining shadowing of a solar energy collector site from solar radiation in relation to annual and diurnal periods is, essentially, to prepare a shade mask, or diagram of those objects seen from the site against the sky, and then to combine this shade mask with a diagram to the same scale thus to form a composite diagram showing the path of the sun at the site for the various days of the year. The hour and the dates when the shadows occur are then read from the composite diagram. This graphical method requires not only that information be obtained in the field for the shadow mask, but also requires preparation of both a shade mask and a solar path diagram, and, finally, that these diagrams be combined before a desired reading of times and dates when shadows are cast on a proposed collector site can be made. It is, of course, necessary to repeat these procedures for each potential solar energy collector site under consideration.

This method, obviously, is relatively complex and time consuming. In addition, the graphical procedures aforedescribed require persons having special skill and training in their performance. As a result of these factors, the present method for determining the effect of shadowing by terrestrial objects on a solar energy system is relatively expensive and time consuming.

It is, therefore, the general purpose of the instant invention to provide a simple and economic method and device for use by relatively unskilled personnel in rapidly predicting periods of terrestrial object occlusion of a moving source of celestial radiation at proposed energy collector sites.

OBJECTS AND SUMMARY OF THE INVENTION

Accordingly, it is an object of the present invention to provide an improved method and indicator for determining the shadowing of a location on the surface of the earth by terrestrial objects, especially shadowing of a solar energy collector site from solar radiation.

Another object is to provide a method for determining periods of occlusion by terrestrial objects of celestial radiation, relative to a terrestrial location.

Another object is to provide a method and shadow indicator which can be used in the field to indicate potential shadowing of a selected terrestrial location.

Another object is to provide an indicator which gives direct readings for annual and diurnal periods during which shadowing of a selected site occurs.

Another object is to provide a shadow position indicator which may be utilized at any time of the day or year.

Another object is to provide an indicator which determines the times of day and year at which shadowing occurs in an absence of intermediate graphical procedures.

Another object is to provide an indicator which is inexpensive and which can be operated by relatively unskilled personnel in predicting shadow-casting characteristics of given bodies at fixed locations.

Further objects and advantages are to provide improved elements and arrangements thereof in a radiation shadow indicator provided for the purposes herein described which are dependable, durable, and fully effective in accomplishing their intended purpose.

These and other objects and advantages are achieved through the use of a method in which is employed a radiation shadow indicator, characterized by a gimbal supported, target-forming sight tube, as will become more readily apparent by reference to the following description and claims in light of the accompanying drawings.

DESCRIPTION OF THE PREFERRED EMBODIMENT

Figure 1:
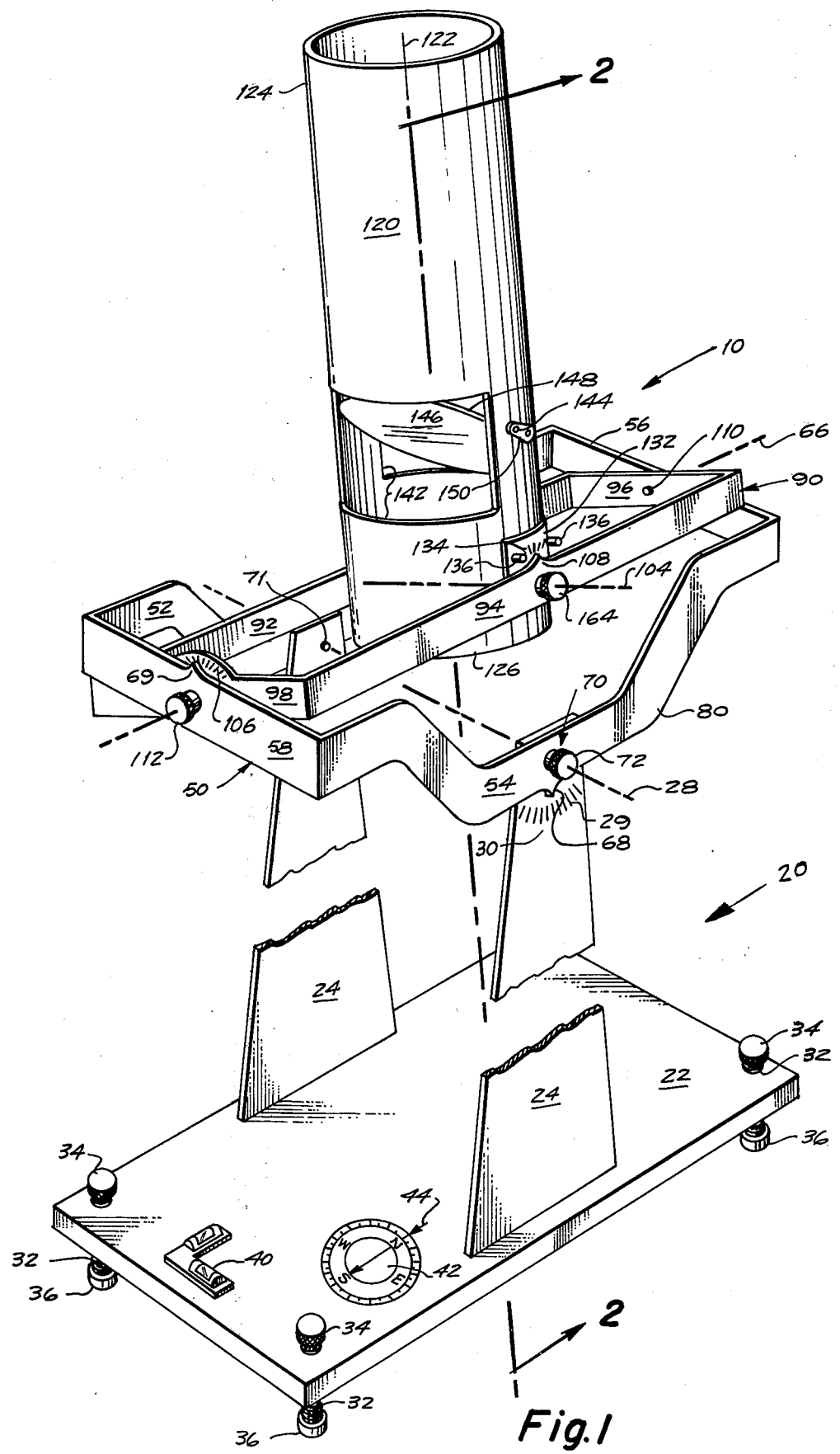
FIG. 1 is a perspective, fragmented view depicting a radiation shadow indicator which embodies the principles of the instant invention.

Referring now with more particularlity to the drawings, there is shown in FIG. 1 a radiation shadow indicator 10 which embodies the principles of the present invention.

The shadow indicator, generally designated 10, includes a base 20. The base 20, as shown, includes a substantially rectangular, horizontally disposed bed plate 22. Extended upwardly from the plate 22 there is a pair of parallel planar gimbal supports 24, disposed in mutually spaced planes. These supports are affixed to the plate 22 in any suitable manner. A pair of coaxially aligned bores 26, FIG. 2, extend horizontally through the upper end portions of the gimbal supports 24 with the axis thereof serving to define a latitude axis, designated 28.

Indicia 29 defining arcuate latitude scale 30, graduated in degrees of arc, is provided on the outwardly disposed side surface of at least one of the gimbal supports 24 in concentric relation with the latitude axis 28. The scale 30, as shown, includes "zero" degree indicia vertically oriented beneath the latitude axis, while indicia designating graduations of latitude oppositely progress from the zero degree indicia.

In practice, a plurality of leveling screws 32 is provided and extended perpendicularly in mutually spaced relation through the bed plate 22 in a screw threaded engagement therewith. Although, as shown in FIG. 1, a leveling screw is provided at each corner of the bed plate, it is to be understood that any suitable number and arrangement of leveling screws 32 is provided. The leveling screws are adapted for axial movement and are provided with finger knobs 34 at their uppermost ends and with feet 36 at their lowermost ends. The feet serve to engage the surface used to support the shadow indicator 10. For aiding in leveling the indicator 10, a bubble level 40 is mounted on the bed plate 22 toward one side thereof, and serves to indicate when the latitude axis 28 is horizontally disposed as well as to indicate when the zero degree point of the latitude scale 30 is directly beneath the axis 28 in order to establish a zero latitude reference.

A magnetic compass 42 also is mounted on the bed plate 22, near one corner. The compass 42 serves to provide a north-south reference indicated by an arrow 44 in aligning the indicator preparatory to operation. It is to be understood that since "true north" and "magnetic north" are not coincident at all locations, correction for compass variation may be required in the interest of accuracy.

The shadow indicator 10 also is provided with an outer or first gimbal member 50 comprising an elongated rectangular frame mounted for pivotal movement about the latitude axis 28. The gimbal member 50 includes a first side 52, a second side 54, a first end 56 and a second end 58. The sides 52 and 54 extend in parallelism with the longitudinal axis of the gimbal and orthogonally with respect to the axis 28. The facing surfaces of the sides 52 and 54 are spaced apart a distance slightly greater than the distance between the outer surfaces of the gimbal supports 24, measured along the latitude axis. The central portions of these sides are offset downwardly from their end portions and conform generally to inverted arch configurations for purposes which will hereinafter be more fully described. A pair of aligned bores 62 extend through the sides 52 and 54 in concentric relation with the latitude axis and in coaxial alignment with the adjacent bores 26 formed in the gimbal supports 24.

The gimbal member 50 also includes a pair of coaxially aligned bores 64 extending through the opposite ends 56 and 58 in concentric relation with the longitudinal axis of symmetry thereof. Thus the axis of the bores 64 define an axis herein referred to as an aximuth axis 66. Also projected from the side 54 of the gimbal member 50 is a latitude pointer 68. This pointer serves to indicate the inclination of the gimbal member 50 from horizontal on the latitude scale 30 for thus indicating the inclination of the azimuth axis 66. The end 58 of the gimbal member 50 also is provided with another pointer, designated 69. The pointer 69 projects upwardly from the end of the gimbal member 58, perpendicularly to the aximuth axis, for reasons which will hereinafter become more readily apparent.

Figure 4:
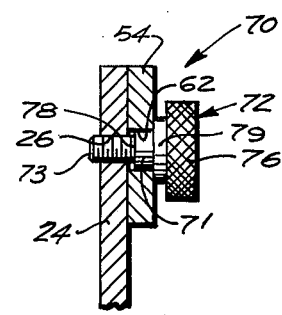
FIG. 4 is a fragmentary sectional view taken generally along lines 4—4 of FIG. 3, showing a clamping knob and associated elements.

In order to accommodate pivotal displacement of the gimbal member 50, as well as to support the gimbal member in fixed relation with respect to the gimbal supports 24, and thus support the axis 66 at a fixed angle of inclination relative to horizontal, a pair of pivotal supports 70 is provided. Each of these supports comprises a pivot pin 71 having a clamping knob 72 affixed to the shaft of the pin, at one end thereof, and a screw thread 73 provided at the opposite end of the shaft, as best shown in FIG. 4.

The pin 71 extends through the bore 62 formed in the side 54 of the gimbal member 50, and is received at its threaded end portion by an internal thread formed in the bore 26 of the adjacent support 24. A cylindrical bearing surface terminating in an annular shoulder 78 is provided for pivotally supporting the gimbal member 50 at each of its opposite sides. The clamping knob 72 includes a knurled head 76, for facilitating manipulation, and a contiguously related clamping element 79 of an annular configuration. The surface of the clamping element frictionally engages the side 54 as the pin is threaded into the adjacent bore 26. The axial length of the bearing surface, aforementioned, is somewhat less than the depth of the bore 62 so that the side 52 of the gimbal member 50 is brought into frictional clamping engagement, between the clamping element of the knob 72 and the adjacent surface of the support 24, as the pin 71 is advanced into the screw threaded bore 26.

The shadow indicator 10 also is provided with an inner or second gimbal member, designated 90. This member is supported by the outer gimbal member 50 for pivotal movement about the azimuth axis 66. The inner gimbal member 90 also comprises a frame of an elongated, substantially rectangular configuration and is centered within the outer gimbal member 50. The gimbal member 90 includes a first side 92 and a second side 94, extended in parallelism with the axis 66. A first end 96, and a second end 98 are provided for the gimbal member 90 in orthogonal relation with the sides 92 and 94.

Figure 3:
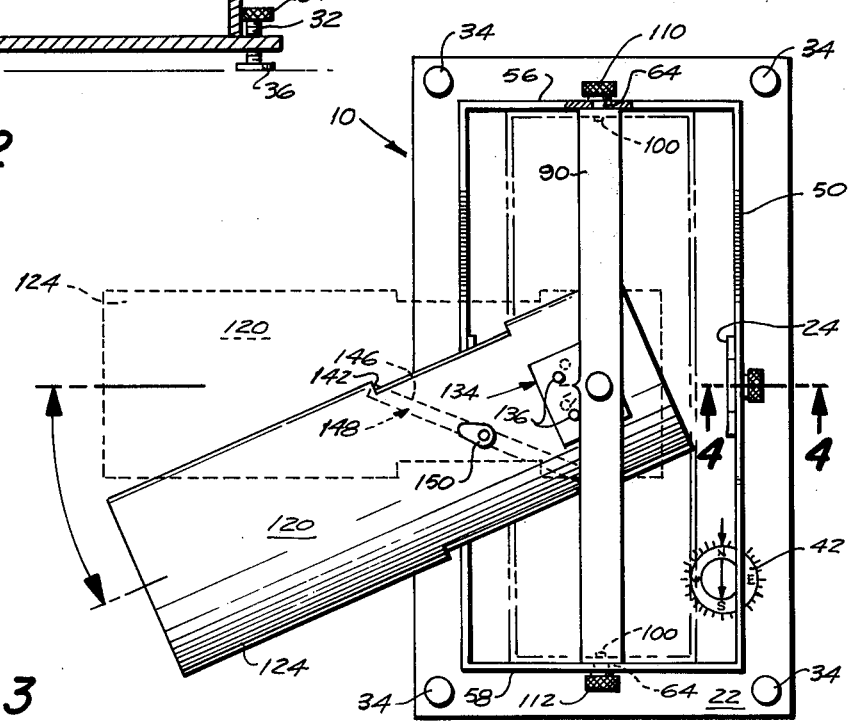
FIG. 3 is a top plan view of the indicator depicting alternate positions for the sight tube in a horizontal disposition.

As shown in FIG. 3, a pair of aligned bores 100 individually extend through the ends 96 and 98 of the gimbal of the gimbal member 90 in coaxial alignment with the bores 64 provided in the ends of the gimbal member 50, the purpose of which will hereinafter become more readily apparent. The gimbal member 90 also is provided with a pair of aligned bores 102 individually extended centrally through the sides 92 and 94 for defining a declination axis 104, also as will hereinafter become more readily apparent.

Indicia defining an arcuate azimuth scale 106 is provided on the surface of the end 98 of the inner gimbal member 90, in juxtaposition with the azimuth pointer 69. The azimuth scale 106 is concentric with the azimuth axis 66 and is adapted to indicate the instantaneous angular position of the declination axis 104 about the azimuth axis 66. The azimuth scale is, preferably, graduated in degrees of arc indicating angular position relative to the horizontal. However, where desired, the scale is graduated relative to vertical, or graduated in the time of day corresponding to said angular position. Moreover, where desired, the scale is graduated in any combination of the graduations aforementioned.

The second gimbal member 90 includes a declination pointer 108 extended upwardly from the side 94. The purpose of the pointer 108 will hereinafter become more readily apparent. The second gimbal member 90 is pivotally supported by a pair of pins 110 of pivotal supports, not designated, similar to the pivotal supports 70. Each of the pivot pins 110 is extended through a pair of adjacent bores 64 and 100 of the gimbal members 50 and 90, respectively, and includes a screw threaded portion and a bearing portion, not designated, as well as a shouldered clamping knob 112. The pins 110 are fitted to the bores 64 and 100 in a manner similar to that previously described for fitting the pivot pins 71 in the bores 26 and 62. The pins accommodate pivotal movement of the gimbal member 90, relative to the gimbal member 50, as well as facilitate a clamping of these gimbal members together in order to maintain a desired angular relationship therebetween.

The shadow indicator 10 also includes a sight tube 120 of a substantially cylindrical configuration. The sight tube is mounted on and supported by the inner gimbal member 90 for pivotal movement about a declination axis, designated 104. The longitudinal axis of symmetry for the sight tube 120 is coincident with an optic axis, herein referred to as a sight axis 122, and extends perpendicularly with respect to the declination axis 104.

Figure 2:
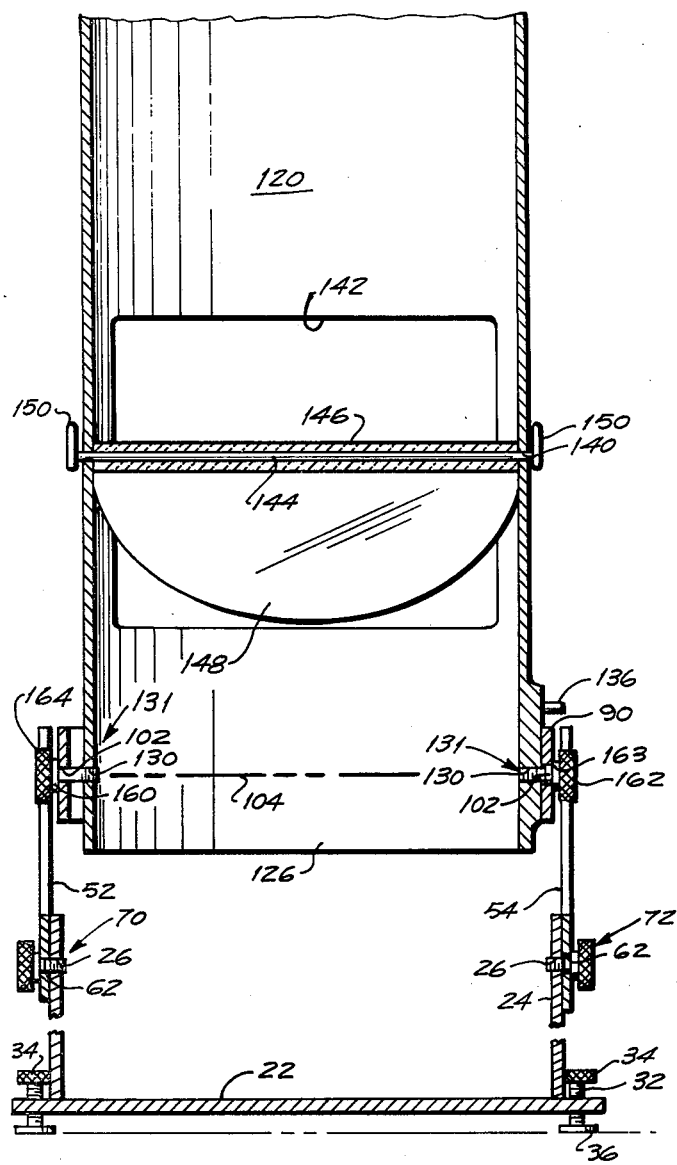
FIG. 2 is a fragmented longitudinal sectional view of the indicator taken along lines 2—2 of FIG. 1 showing a sight tube utilized in the indicator, and elements associated therewith.

The exterior diameter of the sight tube 120 is somewhat less than the distance between the sides 92 and 94 of the inner gimbal member 90. The tube is characterized by an objective end portion, designated 124, and a base end, designated 126. As best shown in FIG. 2, the sight tube 120 also includes a pair of diametrically opposite aligned bores 130 concentrically related to the declination axis 104 and disposed in coaxial alignment with the aforementioned bores 102 provided in the inner gimbal member 90. These coaxially aligned bores serve to receive wrist pin assemblies, generally designated 131, which serve to support the sight tube 120, as hereinafter more fully described.

A declination plate 132 having a planar surface is provided on the surface of the sight tube. The declination plate 132 is of a planar configuration and is provided with indicia defining an arcuate declination scale. The declination pointer 108, aforementioned, is provided to indicate by its position along the declination scale the relative angular position of the sight axis 122 relative to the declination axis 104.

The declination scale of the plate 132 preferably is graduated in degrees of arc for indicating inclination of the sight axis 122 from perpendicular or, where desired, is graduated to indicate relative inclination corresponding to the angle of inclination of the axis of the earth at various seasons. Any combination of graduations can, of course, be utilized.

As is well understood, inclination of the axis of the earth can never exceed approximately twenth-three and one-half degrees when measured with respect to the earth's inclination axis position at equinox. Therefore, a pair of substantially cylindrical declination stop pins 136 is provided for limiting to the angular movement of the sight axis 122 about the declination axis 104. The stop pins extend from the declination plate substantially parallel to the declination axis and are positioned to individually engage the upward edge of the side 94 of the inner gimbal member 90, as shown in FIG. 3. Thus excessive inclination of the sight tube 120 is precluded.

The sight tube 120 also is provided with a pair of diametrically opposite aligned bores 140, FIG. 2. defining an axis substantially parallel to the declination axis 104 in substantial spaced relation with the declination plate 132. The sight tube also is relieved to include a pair of diametrically opposite viewing openings 142 extending axially of the sight tube equally upwardly and downwardly with respect to the axis defined by the bores 140. As viewed along a direction substantially parallel to the azimuth axis 66, the openings are substantially congruent and extend in substantially equal distances about the periphery of the sight tube.

A mirror shaft 144 is received by the bores 140 and serves to pivotally support an eliptical, planar mirror support body, designated 146, FIG. 2, affixed thereto. This body, in turn, includes mirror surface 148 having a minor axis coincident with its pivotal axis, substantially equal to the internal diameter of the sight tube 120 and a major axis, normally related to its major axis, generally equal in length to that of a line inclined at forty-five degrees to the sighting axis and intercepted by the interior surface of the sight tube. The support body 146 is fixed to the mirror shaft and thus the mirror surface is supported for selective pivotal movement between a pair of positions in which the major axis thereof is oppositely inclined at substantially forty-five degrees with respect to the sight axis 122.

The mirror surfaces 148 can, in operation, be selectively and alternately disposed toward the object end 124 of the sight tube for viewing from the object end along the sight axis 122, while looking generally parallel to the azimuth axis 66 into a viewing opening 142. A pair of mirror levers 150 is fixed to the mirror shaft 144 for facilitating a positioning of the mirror support body with respect to the sight axis. As a practical matter, the mirror levers are externally related to the tube 120 and extend generally perpendicularly from the mirror shaft in substantial parallelism with the mirror surfaces.

Each of the wrist pin assemblies 131 includes a pivot pin 160 extended through the adjacent bores 102 and 130 and is characterized by a screw threaded end portion, not designated, a clamping shoulder 162, and an intermediate bearing surface 163. A knurled positioning knob 164 is affixed to the outermost end of each pivot pin 160, outwardly of the inner gimbal member 90. The pins 160 of the wrist pin assemblies 131 are fitted to the bores 102 and 130 in a manner similar to that previously described for the fitting of the pivot pins 110 to their respective bores, in order to provide for relative pivotal movement and selective clamping of the sight tube to the inner gimbal member 90.

Although, as previously discussed, the sight axis 122 need not have an angle of inclination about the declination axis 104 greater than twenty-three and one-half degrees to either side of the perpendicular to the azimuth axis 66, the sight axis should be positionable into a horizontal plane with the object end 124 of the sight tube 120 disposed either to the east or to the west, and corresponding, respectively, to the position of the sun on the horizon at sunrise and sunset. The inverted arch configuration of the sides 52 and 54 of the outer gimbal member 50, as shown in FIG. 3, permit such positioning. The inverted arches extend from the latitude axis 28 oppositely longitudinally of the outer gimbal member 90 a distance such that the sides of the arches do not engage the sight tube 120 when the tube is disposed at its maximum angle of inclination of twenty-three and one-half degrees from perpendicular, at a reading of 90 degrees on scale 106.

The centrally positioned dashed lines depict the position of the sight tube 120 when the sight axis 122 is in a vertical plane, corresponding to the plane of the meridian of the earth passing through the point on the surface of the earth at which the shadow indicator 10 is positioned. Although the shadow indicator as depicted in FIGS. 1 and 3 is positioned for use in the northern hemisphere, it is to be understood that the instrument is equally adapted for use in the southern hemisphere.

OPERATION

The operation of the preferred embodiment of the present invention is believed to be clearly apparent, however, it is for the sake of clarity briefly summarized at this point.

The radiation shadow indicator 10 is transported to a situs of use on the surface of the earth which is to be investigated for shadowing, and is positioned with the feet 36 of the leveling screws 32 resting on any convenient surface. The latitude axis 28 generally is horizontally oriented in east-west directions, simply by rotating the entire indicator 10 to align the instrument in north-south directions, compass variation having been effected.

The latitude axis 28 now is placed in a true horizontal relation to the earth by appropriate rotation of leveling screws 32, as indicated from observation of the bubble level 40. The azimuth axis 66 is placed in parallel relationship with the axis of the earth by slightly loosening the knob 72 so that movement of the outer gimbal member 50, about the latitude axis 28, is accommodated.

The angular relation of the azimuth axis 66 in relation to the base is then adjusted so that the latitude pointer 68 indicates, on the latitude scale 30, the latitude of the location at which the shadow indicator is being used. The knob 72 is then rotated to bring the side of the outer gimbal member 50 into frictional clamping engagement with the adjacent gimbal support 24 for thus securing the shadow indicator in the correct latitude adjustment. The mirror level 150 is moved to position the mirror support body 146 into one of its alternate positions for causing the mirror surface 148 to face a viewing opening 142 for most convenient viewing. In the northern hemisphere, the object end 124 of the sight tube 120 is usually inclined to the south. Hence, the north opening 142 usually is deemed to be the most convenient opening for purposes of viewing along the sight axis of the sight tube. The adjustments required to set up the shadow indicator 10 at a particular location on the surface of the earth may, of course, be made in any suitable sequence.

When the shadow indicator 10 is set up for a given point on the surface of the earth at which the indicator is being used, the terrestrial objects which will shadow the point from radiation propagated from a celestial object during a day or season are determined by pivotally traversing the sight tube 120 about the azimuth axis 66 so that the sight axis 122 moves in the plane of the apparent diurnal movement of the celestial object about the earth. As the sight tube is so traversed, a sight taken through the viewing opening 142 will scan an apparent path of the celestial object, and any terrestrial object whose reflection is seen in the mirror surface 148 will shadow the point at which the instrument is located from radiation from a celestial body moving in the plane.

The times of day and the seasons of the year at which such shadowing will occur can be determined by the indication, respectively, of the azimuth pointer 69 on the azimuth scale 106 and the indication of the declination pointer 108 on the declination scale 134. Usually, the periods of shadowing will be determined for times of day for a particular season simply by clamping the sight tube to the inner gimbal member 90 to maintain an angular relation between the sight axis and the declination axis 104, corresponding to a particular season, and then pivoting the inner gimbal member 90 about the azimuth axis 66 for viewing a diurnal path of radiation.

However, shadowing at different seasons at a particular time of day may be conveniently determined by clamping the inner gimbal member 90 to the outer gimbal member 50, in order to maintain a desired angular relationship between the declination axis 104 and horizontal, and then pivoting the sight tube 120 about the declination axis 104 to locate the celestial body. The knob 112 and the knob 164 also can be used to secure the sight tube 120 in order to maintain its angular position about the azimuth axis 66 and declination axis 104 while readings are made on the azimuth and declination scales.

Since, as previously discussed, the seasonal change in the solar declination cannot exceed twenty-three and one-half degrees, the declination stop pins 136 engage the side 94 of the inner gimbal member 90 in order to limit the angular movement of the sight axis 122, about the declination axis 104 on either side of perpendicular to the azimuth axis 55. This provision permits rapid scanning for terrestrial objects shadowing the point at which the shadow indicator 10 is being used, since it is not necessary to observe the declination scale 134 during such scanning in order to determine when the sight axis is within the useful limits of its pivotal movement about the declination axis.

While the shadow indicator 10 is intended primarily for detection of shadowing of terrestrial objects from celestial radiation, especially solar radiation, it is to be understood that the shadow indicator 10 is adaptable for detecting shadowing of radiation from other sources, especially if the stop pins 136 limiting angular movement of the sight tube 120 about the declination axis 104 are removed.

Although the invention has been herein shown and described in what is conceived to be the most practical and preferred embodiment, it is recognized that departures may be made therefrom within the scope of the invention, which is not to be limited to the illustrative details disclosed.

I claim:

1. A portable instrument for establishing a period of time during which a terrestrial object adjacent a selected terrestrial location will occlude a celestial source of radiation comprising:
  (a) a base positionable at said selected location;
  (b) a first member selectively pivotal on the base about a latitude axis and having an azimuth axis perpendicular to the latitude axis;
  (c) a second member selectively pivotal on the first member about the azimuth axis and having a declination axis perpendicular to and intersecting the azimuth axis;
  (d) a sight tube selectively pivotal on the second member about the declination axis, the sight tube having an optic axis perpendicular to the declination axis and passing through a point at which the declination axis intersects the azimuth axis; and
  (e) means on the base for positioning the latitude axis such that the first member can be rotated on the base about the latitude axis to a selected position at which the azimuth axis is aligned with the terrestrial axis of rotation.

2. A portable instrument according to claim 1 including means for selectively clamping the second member to the first member so that the declination axis occupies a predetermined angular position measured with respect to the latitude axis.

3. A portable instrument according to claim 1 including means for selectively clamping the sight tube to the second member so that the optic axis occupies a predetermined angular position measured with respect to the azimuth axis.

4. A method for establishing the hour of a given day of the year at which a terrestrial object adjacent a selected terrestrial location will occlude a celestial source of radiation comprising:
   (a) positioning an azimuth axis of a base so that solid axis is parallel to the terrestrial axis of rotation;
   (b) rotating a sight tube having a optic axis about a declination axis of a member, the declination axis being parpendicular to and intersecting the optic axis and the aximuth axis being perpendicular to the declination axis and passing through the intersection of the optic axis and the declination axis, until the angular position of the sight tube with respect to said azimuth axis corresponds to the known declination angle of the celestial object for the given day of the year;
   (c) clamping said sight tube in the resulting angular relationship with the azimuth axis;
   (d) pivoting the member about said azimuth axis; and
   (e) sighting along the optic axis during pivotal movement of the member about the azimuth axis for visually determining terrestrial objects that intercept said optic axis during the last mentioned pivotal movement.

5. A method according to claim 4 including the step of recording the angular positions of the member relative to the azimuth axis (i.e., the hour) at which a terrestrial object intercepts said optic axis.

6. A method for establishing the days of the year at a given hour at which a terrestrial object adjacent a selected terrestrial location will occlude a celestial source of radiation comprising:
   (a) positioning an azimuth axis of a base so that said axis is parallel to the terrestrial axis of rotation;
   (b) rotating a member having a declination axis about said azimuth axis, the declination axis being perpendicular to and intersecting the azimuth axis;
   (c) clamping the member to the base at an angular position of the declination axis corresponding to the given hour;
   (d) pivoting a sight tube mounted on the member for rotation about the declination axis, the sight tube having an optic axis perpendicular to the declination axis; and
   (e) sighting along the optic axis of during axis pivotal movement of the sight tube about the declination axis for visually determining terrestrial objects intersecting said optic axis.

7. A method according to claim 6 including a step of recording the angular positions of sight tube as measured from the azimuth axis (i.e., the days of the year) at which a terrestrial object intersects said optic axis.

* * * * *